(12) United States Patent
Cabaleiro Martins et al.

(10) Patent No.: US 11,368,572 B2
(45) Date of Patent: Jun. 21, 2022

(54) ELECTRICAL HOUSEHOLD APPLIANCE AND METHOD FOR OPERATING THE ELECTRICAL HOUSEHOLD APPLIANCE

(71) Applicant: BSH HAUSGERAETE GMBH, Munich (DE)

(72) Inventors: Marcelo Cabaleiro Martins, Berlin (DE); Burkhard Gorzitza, Berlin (DE); Jens Kittan, Oberkraemer (DE); Juergen Muehl, Berlin (DE)

(73) Assignee: BSH Hausgeraete GmbH, Munich (DE)

(*) Notice: Subject to any disclaimer, the term of this patent is extended or adjusted under 35 U.S.C. 154(b) by 0 days.

(21) Appl. No.: 16/794,429

(22) Filed: Feb. 19, 2020

(65) Prior Publication Data
US 2020/0267251 A1    Aug. 20, 2020

(30) Foreign Application Priority Data

Feb. 20, 2019    (DE) .......................... 102019202284.7

(51) Int. Cl.
*H04M 1/725*    (2021.01)
*H01H 9/22*    (2006.01)
(Continued)

(52) U.S. Cl.
CPC ..... *H04M 1/72415* (2021.01); *A47L 15/0063* (2013.01); *D06F 33/00* (2013.01); *D06F 39/14* (2013.01); *D06F 58/20* (2013.01); *H01H 9/226* (2013.01); *H04L 12/282* (2013.01); *H04L 12/2809* (2013.01); *H04L 12/2823* (2013.01);
(Continued)

(58) Field of Classification Search
CPC .............. H04M 1/72533; H01H 9/226; A47L 15/0063; D06F 12/282; D06F 2101/00; D06F 39/14; D06F 58/20; D06F 33/00; H04L 12/2809
See application file for complete search history.

(56) References Cited

U.S. PATENT DOCUMENTS 9,092,971 B2 * 7/2015 Symoen ................. G08C 17/02
10,341,483 B2 * 7/2019 Dods ................... H04W 68/005
(Continued)

FOREIGN PATENT DOCUMENTS

DE    102017212327 A1    1/2019
EP    2706138 A1    3/2014
(Continued)

*Primary Examiner* — Muthuswamy G Manoharan
(74) *Attorney, Agent, or Firm* — Laurence A. Greenberg; Werner H. Stemer; Ralph E. Locher

(57) ABSTRACT

An electrical household appliance includes a communication interface configured to communicate with a communication device through a communication connection. A remote control facility is configured to make it possible to operate the electrical household appliance by way of a communication device. A door is configured to open a region of the electrical household appliance in an open state or to close the region in a closed state. A monitoring facility is configured to detect the state of the door. A controller is configured to automatically activate the remote control facility if the door is in the closed state and the electrical household appliance is activated locally. A method for operating an electrical household appliance is also provided.

18 Claims, 2 Drawing Sheets

(51) Int. Cl.
*H04L 12/28* (2006.01)
*A47L 15/00* (2006.01)
*D06F 33/00* (2020.01)
*D06F 39/14* (2006.01)
*D06F 58/20* (2006.01)
*H04M 1/72415* (2021.01)
*D06F 101/00* (2020.01)

(52) U.S. Cl.
CPC ....... *A47L 2501/22* (2013.01); *D06F 2101/00* (2020.02); *H04L 2012/2841* (2013.01)

(56) References Cited

U.S. PATENT DOCUMENTS

| | | | |
|---|---|---|---|
| 10,633,778 B2 | 4/2020 | Park et al. | |
| 2016/0274161 A1* | 9/2016 | Jeon | G01R 11/60 |
| 2017/0163438 A1* | 6/2017 | Gary, Jr. | H04L 67/2814 |
| 2018/0081331 A1* | 3/2018 | Gary, Jr. | H04L 12/2803 |
| 2020/0141038 A1* | 5/2020 | Xu | D06F 34/28 |
| 2020/0149204 A1 | 5/2020 | Xu et al. | |
| 2020/0154973 A1 | 5/2020 | Alemany et al. | |

FOREIGN PATENT DOCUMENTS

| | | |
|---|---|---|
| EP | 3045579 A1 | 7/2016 |
| WO | 2018196608 A1 | 11/2018 |

\* cited by examiner

ELECTRICAL HOUSEHOLD APPLIANCE AND METHOD FOR OPERATING THE ELECTRICAL HOUSEHOLD APPLIANCE

CROSS-REFERENCE TO RELATED APPLICATION

This application claims the priority, under 35 U.S.C. § 119, of German Patent Application DE 10 2019 202 284, filed Feb. 20, 2019; the prior application is herewith incorporated by reference in its entirety.

BACKGROUND OF THE INVENTION

Field of the Invention

The present invention relates to an electrical household appliance and a method for operating an electrical household appliance.

Electrical household appliances, such as in particular washing machines but also washer-dryers or dishwashers, may be operated remotely, in other words remotely controlled, by using communication devices such as a mobile telephone, tablet or the like. In so doing, it is possible to perform different actions, such as starting a cleaning program that is implemented on the electrical household appliance or switching off the electrical household appliance.

Due to safety requirements, it may be provided that it is only possible to remotely control an electrical household appliance, in particular a washing machine, if a further action is performed locally after a door of the electrical household appliance has been closed. The term 'locally' in this case is understood to mean that the action is performed on site, in other words on the electrical household appliance itself. Such a further local action may be by way of example manually switching-on the electrical household appliance or starting a cleaning program. Furthermore, it is generally necessary that a remote control facility of the electrical household appliance is activated locally, by way of example in that a corresponding button on a control panel on the electrical household appliance is actuated in order to render it possible for the electrical household appliance to be remotely controlled. If the user forgets to activate the remote control facility, it is not possible to remotely control the electrical household appliance, in other words by way of example to start or terminate a cleaning program. The possibility of monitoring the operation of the electrical household appliance "remotely," by way of example querying a state in particular of a program level of the electrical household appliance, by using a smart phone, may be provided regardless of whether the above described requirements for remotely controlling the electrical household appliance are fulfilled or not.

SUMMARY OF THE INVENTION

It is accordingly an object of the invention to provide an electrical household appliance and a method for operating the electrical household appliance, which overcome the hereinafore-mentioned disadvantages of the heretofore-known appliances and methods of this general type.

With the foregoing and other objects in view there is provided, in accordance with the invention, an electrical household appliance having a communication interface that is configured so as to communicate with a communication device through a communication connection; a remote control facility that is configured so as to render it possible to operate the electrical household appliance by way of the communication device; a door that is configured so as in an open state to open a region of the electrical household appliance or in a closed state to close that region; a monitoring facility that is configured so as to detect the state of the door; and a controller that is configured so as to automatically activate the remote control facility if the door is in the closed state and the electrical household appliance has been activated locally.

The technical advantage is thus achieved that a remote control facility, by way of example a so-called Remote Start Allowance, RSA for short, may be activated automatically by locally activating the electrical household appliance. As a result of the remote control facility having been activated, a user is able to access the electrical household appliance through a communication device in order to perform specific actions, by way of example to start a program that is implemented on the electrical household appliance even if the user has forgotten to activate the remote control facility locally. Simultaneously, by virtue of the fact that the state of the door is checked and also that the user performs a further local action on the electrical household appliance, namely that the electrical household appliance is activated locally, a higher safety standard is ensured, by way of example the standard IEC 60335-2-7, paragraph 20.106.

A user may use the remote control function and by way of example start a program remotely if the electrical household appliance has been switched on. It is possible to forego additional operating elements, by way of example a button for activating the remote control facility.

The remote control facility renders it possible to control procedures remotely, in this case in other words to switch off the electrical household appliance, to start, stop or terminate a program and the like. Furthermore, the electrical household appliance may be configured so as to render it possible for the communication device to monitor the operation of the electrical household appliance "remotely," by way of example to query a state, in particular a program state of the electrical household appliance, and indeed regardless of whether the door is in the closed state and whether the electrical household appliance has been activated locally.

The monitoring facility may be integrated in the controller. The controller may be a central controller of the electrical household appliance or rather a program controller.

If the electrical household appliance is switched off or transferred into a standby state, a melody may ring out. Likewise, further actions, such as activating the remote control facility or starting a program, may be indicated by way of a sound, in particular a characterizing melody. The described functions may also be implemented on an electrical household appliance that does not include a communication interface, which although without a function but also without limitations during use, is in other words downward compatible.

In one embodiment, the electrical household appliance is a laundry care appliance, in particular a washing machine or a washer-dryer, or a dishwasher.

The technical advantage is thus achieved that it is possible to perform the remote control procedure in the case of the corresponding electrical household appliances in a user-ergonomic manner and in an operationally safe manner.

In one embodiment, the communication interface includes a mobile phone network interface and/or a WLAN interface and/or a LAN interface.

The technical advantage is thus achieved that it is possible to communicate with the Internet and/or a mobile phone network.

In one embodiment, the remote control facility is configured so as to render it possible to start a program of the electrical household appliance, to interrupt or terminate a program of the electrical household appliance, to change operating parameters of a program of the electrical household appliance, by way of example an operating temperature, a spin speed and the like, to select a different program of the electrical household appliance and/or to deactivate the electrical household appliance.

The technical advantage is thus achieved that a user may switch on and switch off or rather stop the electrical household appliance remotely. This may increase safety but also may increase the user's feeling of safety.

In one embodiment, the monitoring facility includes a sensor that is disposed on a door lock and the sensor detects whether the door is in the closed state or the open state.

The technical advantage is thus achieved that it is possible to detect whether the door is reliably closed, in other words whether the door lock is snapped in and the door is securely locked.

In one embodiment, local activation includes switching the electrical household appliance on, in that an operating voltage is applied to the controller or the electrical household appliance is transferred from a standby state or energy saving mode into an operating state. In one embodiment, the monitoring facility is configured so as even in such a standby state to detect the state of the door. This renders it possible that then, if the electrical household appliance is switched on, in other words an operating voltage is applied to the controller or the electrical household appliance is transferred from the standby state into the operating state, the remote control function is automatically activated if the door is in the closed state.

The technical advantage is thus achieved that the remote control facility is automatically activated as the electrical household appliance is switched on in the case of a closed door. It is consequently not possible for a user to forget to activate the remote control facility.

In one embodiment, local activation includes starting a program on the electrical household appliance.

The technical advantage is thus achieved that the remote control facility is automatically activated as a program of the electrical household appliance is switched on in the case of a closed door. It is consequently not possible for a user to forget to activate the remote control facility. By way of example, it is thereby possible for the electrical household appliance to be started up in the case of an open door, by way of example to apply an operating voltage or to transfer the electrical household appliance from a standby state into an operating state. If then a program, in particular a laundry program or a dishwashing program, is started in the case of a closed door, the remote control facility is automatically activated.

In one embodiment, the controller is configured so as to prevent a program from being activated as long as the door is in the open state.

The program may thereby be started locally on the electrical household appliance. The technical advantage is thus achieved that it is possible to ensure that the user has performed the safety-relevant actions, in this case that the user has closed the door. The requirement of the second further action in addition to starting the program is therefore fulfilled. The user may then remotely control the electrical household appliance, in other words stop, terminate or re-start the program, through the communication interface.

In one embodiment, the controller is configured so as to switch off the electrical household appliance or to transfer the electrical household appliance into a standby state if the electrical household appliance is switched on and the door is opened.

Users generally use the electrical household appliance with different usage sequences. By way of example, the electrical household appliance is first switched on, then the door is opened, then the electrical household appliance is loaded, then the door is closed again, then the remote control facility is activated and subsequently remotely started. In another example, the door is opened first, then the electrical household appliance is loaded, then the door is closed, then the electrical household appliance is switched on, then the remote control facility activated and subsequently remotely started. By virtue of the fact that the controller switches off the electrical household appliance or rather transfers the electrical household appliance into a standby state if the door is opened, a user must always close the door prior to operating the electrical household appliance. Consequently, a safety-relevant activity is automatically performed locally prior to the electrical household appliance being switched on. In other words, the remote control facility may and can always be activated automatically. A user does not forget to switch on the electrical household appliance as frequently as they forget to activate the remote control facility. This means that it is possible to combine the procedures of switching on the electrical household appliance and activating the remote control facility into one operating element, in particular an ON/OFF button.

The technical advantage is thus achieved that a user is only able to switch on the electrical household appliance if the door is closed. Consequently, it is always ensured that by closing the door a user has already performed a local action and also the remote control facility can and may be activated with respect to the above mentioned prerequisites regarding the safety of the technical aspects.

In the case of the electrical household appliance being switched off while a program is running, in particular in the case of adding to the load of the electrical household appliance, if for example the door is opened during a laundry program in order to add a further item of laundry, it is possible to make a note of the program position and, after switching the electrical household appliance back on, to continue with the program from the position where the program was interrupted as the door was opened.

In one embodiment, the controller is configured so as to deactivate the remote control facility if the remote control facility is active and the monitoring facility detects that the door is in the open state.

The technical advantage is thus achieved that, despite the remote control facility being activated automatically, a high safety standard is maintained. If the remote control facility is first automatically activated, it is thus possible, if the door is subsequently opened again, for the remote control facility to be deactivated in order to ensure that the necessary safety conditions are provided.

In one embodiment, the controller is configured so as to prevent the household appliance from being activated locally as long as the door is in the open state.

The technical advantage is thus achieved that a user may not switch the appliance on, in other words activate the appliance, as long as the door is open. As a consequence, it is only possible for the user to activate the electrical household appliance in the case of a closed door, by way of example by activating an ON/OFF button, which then renders it always possible for the remote control facility to be automatically activated by way of the controller.

In one embodiment, the monitoring unit is configured so as to monitor the door when the electrical household appliance is in a standby state.

The technical advantage is thus achieved that it is also possible to switch off the remote control facility in particular in the case of an emergency if an operating voltage is not applied to the electrical household appliance. Furthermore, it is possible by way of the monitoring facility to monitor the door and to perform the described function of activating and deactivating the remote control facility even in further energy saving modes or energy saving states, by way of example in a network standby mode in which network communication is still possible, in a low power mode that is particularly energy saving, in a normal standby state, in an OFF mode in which the extent to which functions are monitored is only minimal, and in similar states and modes. It is possible to adopt the network standby mode automatically. In this case, the remote control facility may remain activated during the network standby mode.

If the user switches off the electrical household appliance, the network standby mode may be adopted in a visible or invisible manner for the user. The procedure of switching on the electrical household appliance, in other words the procedure of applying an operating voltage, may include starting up the electrical household appliance from an OFF state or also from any standby state.

If the monitoring facility is unable to detect the state of the door and/or the door is not closed, the remote control facility may be deactivated.

In the case of a power failure, if it is not possible to detect the state of the door, the remote control facility may not be activated when the supply of an operating voltage to the electrical household appliance is re-connected. In accordance with one embodiment, following a power failure, the remote control facility is then only activated if the door is closed during and following the power failure.

In one embodiment, the remote control facility is configured so as to inform the communication device of a point in time at which the electrical household appliance was last activated and/or a point in time at which the door was last closed.

The technical advantage is thus achieved that a user may check whether the relevant last activity was triggered by the user themselves or whether an unauthorized third party had operated the electrical household appliance.

With the objects of the invention in view, there is also provided a method for an electrical household appliance having a communication interface that is configured so as to communicate with a communication device through a communication connection and having a remote control facility that is configured so as to render it possible to operate the electrical household appliance by way of a communication device, the method including:

monitoring a door of the electrical household appliance by way of a monitoring facility;

detecting an activation of the electrical household appliance by way of a controller; and activating the remote control facility by way of the controller if the monitoring procedure indicates that the door is in a closed state and it has been detected that the electrical household appliance is activated.

The technical advantage is thus achieved that a remote control facility of an electrical household appliance may be activated in an automatic and safe manner.

In one embodiment, the method includes switching off the electrical household appliance by way of the controller if it is detected that the door is in the open state.

The technical advantage is thus achieved that a user locally actuates the door prior to the electrical household appliance being switched on.

Other features which are considered as characteristic for the invention are set forth in the appended claims.

Although the invention is illustrated and described herein as embodied in an electrical household appliance and a method for operating the electrical household appliance, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
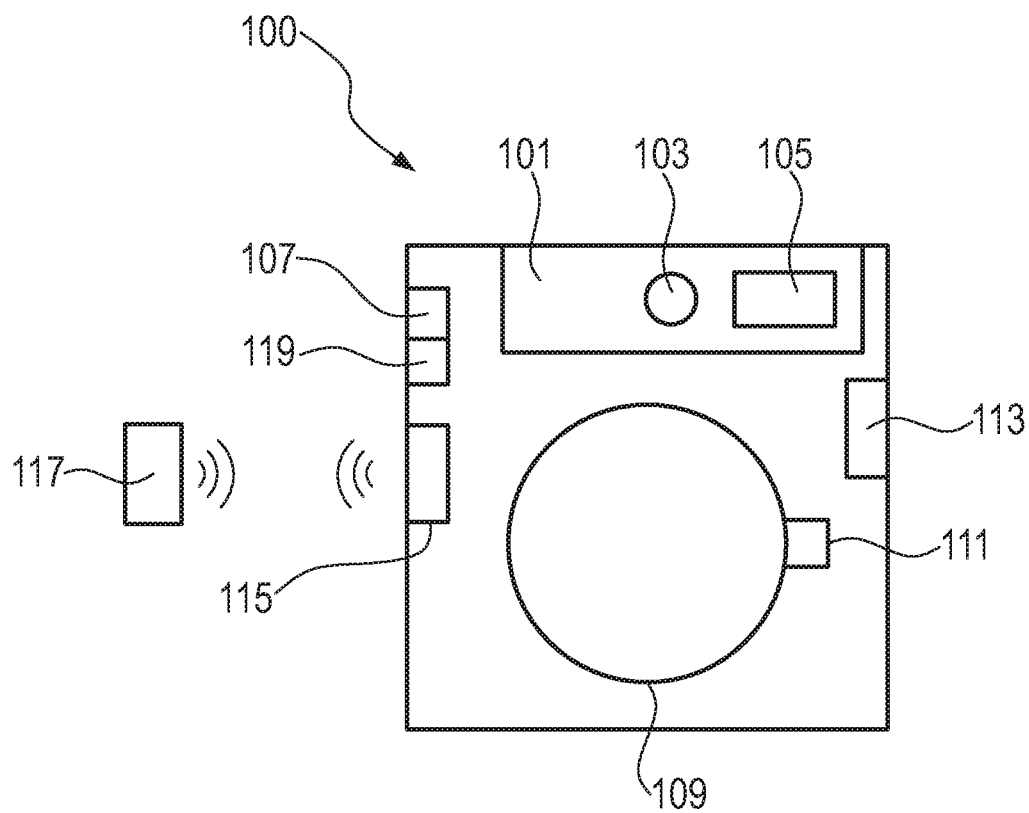
FIG. 1 is a diagrammatic, front-elevational view of an electrical household appliance in accordance with one exemplary embodiment of the invention.

Referring now to the figures of the drawings in detail and first, particularly, to FIG. 1 thereof, there is seen an electrical household appliance 100. The electrical household appliance 100 is a washing machine. In a further exemplary embodiment, the electrical household appliance 100 is a washer-dryer, a dishwasher or another electrical household appliance.

The electrical household appliance 100 has a control panel 101. A user is able to manually operate the electrical household appliance 100 through the control panel 101. The control panel 101 includes a selection button 103 and a display 105. The display 105 may include further operating elements, by way of example an ON/OFF button, a START button, a PAUSE button and the like. In a further exemplary embodiment, the operating possibilities vary. In this case, some or all of the operating elements may be implemented electronically or manually, by way of example through a touch-sensitive display.

The electrical household appliance 100 has a controller 107. The controller 107 is used to control internal cycles of the electrical household appliance 100 in an open-loop and closed-loop manner, in particular to perform programs that have been selected by way of example by a user through the selection button 103. Furthermore, the controller 107 controls in a closed-loop manner by way of example a heating element for heating a washing fluid, a drum rotation rate of a laundry drum and further functions depending upon the type of electrical household appliance 100.

The electrical household appliance 100 has a door 109. The door 109 may adopt an open state and a closed state. In the open state, a user is able to load items into the electrical household appliance 100, by way of example items of laundry or dishware. In the closed state, the electrical household appliance 100 is locked, in other words a user is no longer able to load or unload the electrical household appliance 100.

The electrical household appliance 100 has a sensor 111. The sensor 111 is coupled to a lock of the door 109. By way of example, the sensor 111 is a switch that is flipped if the door 109 is clipped or snapped into the lock or if the lock is opened. In a further exemplary embodiment, a setting angle of the door 109 is detected or a position of a handle of the door 109 is detected or it is detected in another manner whether or not the door 109 is in the closed state.

The electrical household appliance 100 has a monitoring facility or monitor 113. The monitoring facility 113 monitors the sensor 111. The monitoring facility is thus able to detect whether or not the door 109 is closed. In further exemplary embodiments, the sensor 111 may be integrated in the monitoring facility 113 and/or the monitoring facility 113 may be part of the controller 107. The monitoring facility 113 and the sensor 111 may be configured in a relatively simple manner in order to monitor the state of the door 109. By way of example, an electrically conductive wire that in the case of a closed door 109 supplies power and in the case of an open door 109 does not supply power may be used as a monitoring facility 113 and/or sensor 111 within the scope of the present invention.

The electrical household appliance 100 has a communication interface 115. The communication interface 115 may support a mobile phone network interface or a WLAN interface, or another wire-connected or wireless communication standard device.

The communication interface 115 is configured so as to communicate with a communication device or communicator 117. The communication device 117 may be by way of example a mobile telephone. In a further exemplary embodiment, the communication device is a different device that may exchange information through a standard communication device, by way of example a desktop-PC or a laptop-PC.

The communication interface 115 is electronically connected to the controller 107 with the result that the controller 107 may transmit information through the communication interface 115 and may receive control signals from the communication interface 115.

The controller 107 includes a remote control facility or remote controller 119. The remote control facility 119 is configured so as to ensure external, i.e. "remote," access to the electrical household appliance 100. In other words: the remote control facility 119 may allow or prevent the remote control of the electrical household appliance 100. In a further exemplary embodiment, the remote control facility 119 is not integrated in the controller 107 but rather is constructed separately, in particular as a microcontroller.

The controller 107 may activate the remote control facility 119 in order to allow the remote control of the electrical household appliance 100 or deactivate the remote control facility 119 in order to prevent the remote control.

The controller 107 may activate the remote control facility 119 if the door 109 is in the closed state and the electrical household appliance 100 is switched on. The controller 107 may activate the remote control facility 119 if the door 109 is in the closed state and a program is started.

The controller 107 may deactivate the remote control facility 119 if the electrical household appliance 100 is switched on and the door 109 is transferred into the open state, i.e. is opened and the monitoring facility 113 does not detect the closed state.

The electrical household appliance 100 includes a standby state in which the electrical household appliance 100 consumes less energy than in an activated operating state. However, in the standby state, energy continues to be supplied to the communication interface 115 with the result that it is possible to communicate through the communication interface 115. In this standby state, energy is also supplied to the controller 107 and the monitoring facility 113 in order where necessary to be able to switch off the remote control facility 119 in the case of a malfunction.

The controller 107 of the electrical household appliance 100 may moreover be configured so as to automatically switch off the electrical household appliance 100 or to transfer the electrical household appliance into a standby state if the door 107 is opened when the electrical household appliance 100 is in an operating state. In such a standby state, the display 105 of the electrical household appliance 100 may by way of example be switched off or not be illuminated in order to make it visible to the user that the electrical household appliance 100 is in a standby state. Consequently, it is possible to ensure that in order to activate the electrical household appliance 100, i.e. to switch on the electrical household appliance or to transfer the electrical household appliance from the standby state into the operating state, it is necessary for the user locally to both close the door 109 and also by way of example to actuate an ON/OFF button on the electrical household appliance 100. Since this thus fulfils the safety prerequisites that are required according by the Standard IEC 60335-2-7, paragraph 20.106, it is possible in the case of this embodiment to couple the procedure of activating the remote control facility 119 to the activation procedure, i.e. the procedure of switching on or starting up the electrical household appliance 100 from a standby state, in that the activation of the electrical household appliance 100 automatically activates the remote control facility 119.

Figure 2:
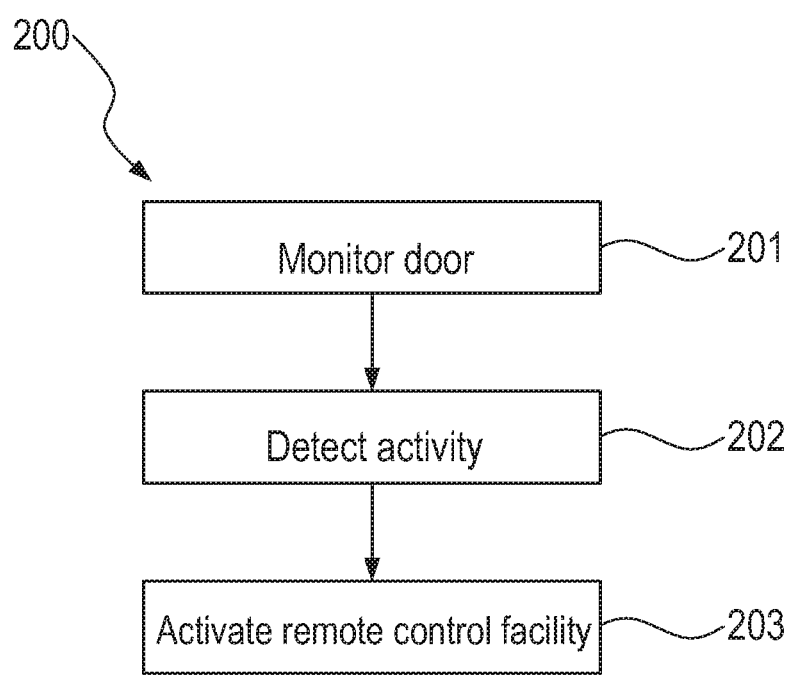
FIG. 2 is a flow diagram for a method in accordance with one exemplary embodiment of the invention.

FIG. 2 illustrates a flow diagram 200 of an exemplary embodiment of a method in accordance with the invention.

In step 201, the door 109 is monitored. The procedure of monitoring the door 109 is performed over the entire operating period of the electrical household appliance 100 and also includes different idle states or standby states, such as a network standby mode.

In order to monitor the door 109, the sensor 111 detects the state of the door 109 with the aid of the closing mechanism of the door 109. In a further exemplary embodiment, the state of the door 109 is detected in a different manner. The monitoring facility 113 queries the state of the door 109 that has been detected by the sensor 111. The monitoring facility 113 then transmits the state of the door 109 to the controller 107. In a further exemplary embodiment, the monitoring facility 113 is integrated in the controller 107, i.e. the controller assumes the functions of the monitoring facility 113.

In a step 202, an activity is detected. In so doing, a local actuation of the electrical household appliance 100 by a user is detected as an activity. The activity may be switching on the electrical household appliance 100. In a further additional or alternative exemplary embodiment, the activity is starting a program. The activity is detected by the controller 107. In a further exemplary embodiment, the activity is detected by a further sensor and the result of the detection procedure is provided to the controller 107.

In a step 203, the remote control facility is activated. For this purpose, the remote control facility 119 is activated with the result that a user may access the electrical household appliance 100 through the communication device 117 and the communication interface 115. The remote control facility 119 is then activated if the above-mentioned conditions are fulfilled, i.e. if the door 109 is in the closed state and the activity is performed, in particular if the electrical household appliance 100 is switched on or the program is started.

If the remote control facility 119 is activated, it is thus ensured by way of monitoring the door 109 in step 201 that the electrical household appliance 100 is closed. If it is detected that the door 109 is no longer in the closed state, the remote control facility 119 is deactivated. In a further exemplary embodiment this deactivation procedure is omitted.

Furthermore, the controller 107 is configured so as to check the status of the remote control facility 119 following a power failure and, if it is not possible to detect the state of the door 109, to deactivate the remote control facility 119. This may be omitted in a further exemplary embodiment.

The controller 107, through the communication interface 115, is configured so as to provide information, such as the remaining duration of a program, point in time at which the program was last activated and/or a point in time at which the door 109 was last closed, type of program and further information.

The controller 107 is configured so as to deactivate the remote control facility 119 if at least one of the following events is detected, and indeed by way of the controller 107 or the monitoring facility 113: power failure at the electrical household appliance 100, the electrical household appliance 100 or the remote control facility 119 have been switched off locally, a malfunction that is listed in a predetermined malfunction catalog has occurred, a program is deactivated, a program on the electrical household appliance 100 has been interrupted locally.

LIST OF REFERENCE CHARACTERS

100 Electrical household appliance
101 Control panel
103 Selection button
105 Display
107 Controller
109 Door
111 Sensor
113 Monitoring facility
115 Communication interface
117 Communication device
119 Remote control facility
200 Flow diagram
201-203 Method steps

The invention claimed is:

1. An electrical household appliance, comprising:
   a communication interface configured to communicate with a communication device through a communication connection;
   a remote control facility configured to permit the electrical household appliance to be operated by said communication device;
   a door configured to open a region of the electrical household appliance in an open state or to close said region in a closed state;
   a monitoring facility configured to detect said state of said door; and
   a controller configured to automatically activate said remote control facility when said door is in said closed state and the electrical household appliance is activated locally, said local activation being performed locally to the household appliance by a user and including switching on the electrical household appliance by at least one of applying an operating voltage to said controller or transferring the electrical household appliance from a standby state or energy saving mode into an operating state;
   said controller configured to deactivate said remote control facility upon an occurrence of certain events, said events including the electrical household appliance or said remote control facility having been switched off locally or an occurrence of a malfunction listed in a predetermined malfunction catalog.

2. The electrical household appliance according to claim 1, wherein the electrical household appliance is a laundry care appliance, a washing machine, a washer-dryer or a dishwasher.

3. The electrical household appliance according to claim 1, wherein said communication interface includes at least one of a mobile phone network interface or a WLAN interface or a LAN interface.

4. The electrical household appliance according to claim 1, wherein said remote control facility is configured to permit:
   a program of the electrical household appliance to be started,
   a program of the electrical household appliance to be interrupted or terminated,
   operating parameters of a program of the electrical household appliance to be changed, or
   the electrical household appliance to be deactivated.

5. The electrical household appliance according to claim 1, wherein said door has a lock, and said monitoring facility includes a sensor disposed on said lock of said door and detecting whether said door is in said closed state or said open state.

6. The electrical household appliance according to claim 1, wherein said local activation includes starting a program on the electrical household appliance.

7. The electrical household appliance according to claim 6, wherein said controller is configured to prevent said program from being activated as long as said door is in said open state.

8. The electrical household appliance according to claim 1, wherein said controller is configured to switch off the electrical household appliance or to transfer the electrical household appliance into a standby state when the electrical household appliance is switched on and said door is opened.

9. The electrical household appliance according to claim 1, wherein said controller is configured to deactivate said remote control facility when said remote control facility is active and said monitoring facility detects that said door is in said open state.

10. The electrical household appliance according to claim 1, wherein said controller is configured to prevent the electrical household appliance from being activated as long as said door is in said open state.

11. The electrical household appliance according to claim 1, wherein said monitoring facility is configured to monitor said door when the electrical household appliance is in a standby state.

12. The electrical household appliance according to claim 1, wherein said remote control facility is configured to inform said communication device of at least one of a point in time at which the electrical household appliance was last activated or a point in time at which said door was last closed.

13. The electrical household appliance according to claim 1, wherein said remote control facility remains activated during a network standby mode.

14. The electrical household appliance according to claim 1, wherein said monitoring facility monitors said door for activating and deactivating said remote control facility during energy saving modes including at least one of a low power mode, a standby mode, and an OFF mode in which functions are monitored to a reduced extent.

15. A method for operating an electrical household appliance, the method comprising the following steps:
   providing a communication interface configured to communicate with a communication device through a communication connection;
   providing a remote control facility configured to permit the electrical household appliance to be operated by the communication device;
   using a monitoring facility to monitor a door of the electrical household appliance;
   using a controller to detect an activation of the electrical household appliance; and
   using the controller to activate the remote control facility when the monitoring facility indicates that the door is in a closed state and the controller detects that the electrical household appliance is activated locally, the local activation being performed locally to the household appliance by a user and including switching on the electrical household appliance by at least one of applying an operating voltage to the controller or transferring the electrical household appliance from a standby state or energy saving mode into an operating state; and
   using the controller to deactivate the remote control facility upon an occurrence of certain events including a local switching off of the electrical household appliance or the remote control facility or an occurrence of a malfunction listed in a predetermined malfunction catalog.

16. The method according to claim 15, which further comprises using the controller to switch off the electrical household appliance upon detecting that the door is in the open state.

17. The method according to claim 15, which further comprises maintaining activation of the remote control facility during a network standby mode.

18. The method according to claim 15, which further comprises using the monitoring facility to monitor the door for activating and deactivating the remote control facility during energy saving modes including at least one of a low power mode, a standby mode, and an OFF mode in which functions are monitored to a reduced extent.

* * * * *